United States Patent
Taneoka (10) Patent No.: US 11,695,144 B2
(45) Date of Patent: Jul. 4, 2023

(54) FUEL CELL SYSTEM, CONTROL APPARATUS, AND CONTROL METHOD

(71) Applicant: SUBARU CORPORATION, Tokyo (JP)

(72) Inventor: Hideyuki Taneoka, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 139 days.

(21) Appl. No.: 16/945,995

(22) Filed: Aug. 3, 2020

(65) Prior Publication Data

US 2021/0075046 A1     Mar. 11, 2021

(30) Foreign Application Priority Data

Sep. 6, 2019   (JP) ................................. 2019-162969

(51) Int. Cl.
*H01M 8/04746*    (2016.01)
*H01M 8/1004*    (2016.01)
(Continued)

(52) U.S. Cl.
CPC ..... *H01M 8/04768* (2013.01); *H01M 8/0258* (2013.01); *H01M 8/0267* (2013.01);
(Continued)

(58) Field of Classification Search
CPC ........... H01M 8/04768; H01M 8/0258; H01M 8/0267; H01M 8/04029; H01M 8/0432;
(Continued)

(56) References Cited

U.S. PATENT DOCUMENTS

2002/0045077 A1*  4/2002  Kotani ............. H01M 8/04776
                                                                         429/412
2004/0197633 A1* 10/2004  Yamamoto ......... H01M 8/0226
                                                                         429/434
(Continued)

FOREIGN PATENT DOCUMENTS

JP          2004193042    *   7/2004
JP         2006-185617 A     7/2006
(Continued)

OTHER PUBLICATIONS

Notice of Reasons for Refusal issued in Japanese Patent Application No. 2019-162969 dated May 9, 2023, with machine translation.

*Primary Examiner* — Matthew W Van Oudenaren
(74) *Attorney, Agent, or Firm* — Troutman Pepper Hamilton Sanders LLP (57) ABSTRACT

A fuel cell system includes a fuel cell, a circuit, a pump, a pressure regulating valve, and a control apparatus. The fuel cell includes a plurality of membrane electrode assemblies and a separator. The separator has a gas channel and a coolant channel. The circuit is coupled to the coolant channel and allows a coolant to circulate therethrough. The pump delivers the coolant toward the coolant channel. The pressure regulating valve adjusts a pressure of the coolant in the coolant channel. The control apparatus controls a flow rate of the coolant in the coolant channel by controlling a rotational speed of the pump on the basis of a temperature of the fuel cell, and controls the pressure of the coolant in the coolant channel by controlling a position of the pressure regulating valve on the basis of a pressure of gas in the gas channel.

8 Claims, 5 Drawing Sheets

(51) Int. Cl.
*H01M 8/0258* (2016.01)
*H01M 8/0267* (2016.01)
*H01M 8/0432* (2016.01)
*H01M 8/0438* (2016.01)
*H01M 8/04029* (2016.01)
*H01M 8/04701* (2016.01)

(52) U.S. Cl.
CPC ..... *H01M 8/04029* (2013.01); *H01M 8/0432* (2013.01); *H01M 8/04417* (2013.01); *H01M 8/04701* (2013.01); *H01M 8/1004* (2013.01); *H01M 8/04358* (2013.01); *H01M 8/04723* (2013.01)

(58) Field of Classification Search
CPC ......... H01M 8/04417; H01M 8/04701; H01M 8/1004; H01M 8/24; H01M 8/04007; H01M 8/04104; H01M 8/04358; H01M 8/04723
See application file for complete search history.

(56) References Cited

U.S. PATENT DOCUMENTS

| | | |
|---|---|---|
| 2010/0239957 A1 | 9/2010 | Yamamoto et al. |
| 2012/0122004 A1* | 5/2012 | Jeon .................. H01M 8/0432 417/32 |
| 2015/0017561 A1 | 1/2015 | Naganuma et al. |
| 2017/0214069 A1 | 7/2017 | Hoshi |
| 2019/0074526 A1 | 3/2019 | Chikugo et al. |

FOREIGN PATENT DOCUMENTS

| | | |
|---|---|---|
| JP | 2006-244758 A | 9/2006 |
| JP | 2008-226523 A | 9/2008 |
| JP | 2009-117220 A | 5/2009 |
| JP | 2010-73343 A | 4/2010 |
| JP | 2010-277704 A | 12/2010 |
| JP | 2014-86131 A | 5/2014 |
| WO | 2016/013333 A1 | 1/2016 |
| WO | 2017/158939 A1 | 9/2017 |

* cited by examiner

FUEL CELL SYSTEM, CONTROL APPARATUS, AND CONTROL METHOD

CROSS-REFERENCE TO RELATED APPLICATIONS

The present application claims priority from Japanese Patent Application No. 2019-162969 filed on Sep. 6, 2019, the entire contents of which are hereby incorporated by reference.

BACKGROUND

The technology relates to a fuel cell system, a control apparatus, and a control method.

In recent years, techniques have been developed to use fuel cells as electric power sources of various apparatuses. A fuel cell includes a stack of a plurality of membrane electrode assemblies each including an electrolyte membrane, an anode electrode, and a cathode electrode. The fuel cell generates electric power by the anode electrode being supplied with fuel gas (e.g., hydrogen gas), and the cathode electrode being supplied with oxidizing gas (e.g., air).

A separator is provided between the adjacent membrane electrode assemblies. The separator is provided with a gas channel through which gas to be supplied to the membrane electrode assemblies flows and a coolant channel through which a coolant flows. The gas channel through which the gas flows includes, for example, a hydrogen channel through which hydrogen gas flows and an air channel through which air flows. The coolant channel is coupled to a circuit through which the coolant circulates. The circuit is provided with a pump that controls a flow rate of the coolant in the coolant channel, thereby controlling a temperature of the fuel cell. Reference is made to Japanese Unexamined Patent Application Publication No. 2010-277704, for example.

SUMMARY

An aspect of the technology provides a fuel cell system including a fuel cell, a circuit, a pump, a pressure regulating valve, and a control apparatus. The fuel cell includes a plurality of membrane electrode assemblies and a separator. The plurality of membrane electrode assemblies is stacked on each other. Each of the membrane electrode assemblies includes an electrolyte membrane, an anode electrode, and a cathode electrode. The separator is provided between the adjacent membrane electrode assemblies and has a gas channel and a coolant channel. The gas channel is configured to allow gas to be supplied to the membrane electrode assemblies to flow therethrough. The coolant channel is configured to allow a coolant to flow therethrough. The circuit is coupled to the coolant channel and configured to allow the coolant to circulate therethrough. The pump is provided in the circuit and configured to deliver the coolant toward the coolant channel. The pressure regulating valve is provided in the circuit and configured to adjust a pressure of the coolant in the coolant channel. The control apparatus is configured to control operation of each of the pump and the pressure regulating valve. The control apparatus is configured to control a flow rate of the coolant in the coolant channel by controlling a rotational speed of the pump on the basis of a temperature of the fuel cell, and control the pressure of the coolant in the coolant channel by controlling a position of the pressure regulating valve on the basis of a pressure of the gas in the gas channel.

An aspect of the technology provides a control apparatus configured to control a fuel cell system that includes a fuel cell, a circuit, a pump, and a pressure regulating valve. The fuel cell includes a plurality of membrane electrode assemblies and a separator. The plurality of membrane electrode assemblies is stacked on each other. Each of the membrane electrode assemblies includes an electrolyte membrane, an anode electrode, and a cathode electrode. The separator is provided between the adjacent membrane electrode assemblies and has a gas channel and a coolant channel. The gas channel is configured to allow gas to be supplied to the membrane electrode assemblies to flow therethrough. The coolant channel is configured to allow a coolant to flow therethrough. The circuit is coupled to the coolant channel and configured to allow the coolant to circulate therethrough. The pump is provided in the circuit and configured to deliver the coolant toward the coolant channel. The pressure regulating valve is provided in the circuit and configured to adjust a pressure of the coolant in the coolant channel. The control apparatus includes a controller configured to control operation of each of the pump and the pressure regulating valve, and configured to control a flow rate of the coolant in the coolant channel by controlling a rotational speed of the pump on the basis of a temperature of the fuel cell, and control the pressure of the coolant in the coolant channel by controlling a position of the pressure regulating valve on the basis of a pressure of the gas in the gas channel.

An aspect of the technology provides a control method that controls a fuel cell system that includes a fuel cell, a circuit, a pump, and a pressure regulating valve. The fuel cell includes a plurality of membrane electrode assemblies and a separator. The plurality of membrane electrode assemblies is stacked on each other. Each of the membrane electrode assemblies includes an electrolyte membrane, an anode electrode, and a cathode electrode. The separator is provided between the adjacent membrane electrode assemblies and has a gas channel and a coolant channel. The gas channel is configured to allow gas to be supplied to the membrane electrode assemblies to flow therethrough. The coolant channel is configured to allow a coolant to flow therethrough. The circuit is coupled to the coolant channel and configured to allow the coolant to circulate therethrough. The pump is provided in the circuit and configured to deliver the coolant toward the coolant channel. The pressure regulating valve is provided in the circuit and configured to adjust a pressure of the coolant in the coolant channel. The control method includes controlling a flow rate of the coolant in the coolant channel by controlling a rotational speed of the pump on the basis of a temperature of the fuel cell, and controlling the pressure of the coolant in the coolant channel by controlling a position of the pressure regulating valve on the basis of a pressure of the gas in the gas channel.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the technology.

DETAILED DESCRIPTION

A separator is provided with a gas channel and a coolant channel. Stress is therefore caused by a pressure difference between gas in the gas channel and a coolant in the coolant channel. In terms of protecting the separator from such stress caused in the separator (i.e., reducing damage to the separator), the pressure difference between the gas in the gas channel and the coolant in the coolant channel may be reduced. The pressure difference may be reduced by controlling a pressure of the coolant in the coolant channel, by controlling a flow rate of the coolant in the coolant channel with the use of a pump provided in a circuit of the coolant. In this method, however, the flow rate of the coolant in the coolant channel is changed by a change in pressure of the gas in the gas channel, which can make it difficult to appropriately control a temperature of a fuel cell.

It is desirable to provide a fuel cell system, a control apparatus, and a control method that make it possible to achieve both protection of a separator in a fuel cell and optimization of a temperature of the fuel cell.

Some embodiments of the technology will now be described in detail with reference to the accompanying drawings. Note that the following description is directed to illustrative examples of the technology and not to be construed as limiting to the technology. Factors including, without limitation, numerical values, shapes, materials, components, positions of the components, and how the components are coupled to each other are illustrative only and not to be construed as limiting to the technology. Further, elements in the following example embodiments that are not recited in a most-generic independent claim of the technology are optional and may be provided on an as-needed basis. The drawings are schematic and are not intended to be drawn to scale. Throughout the present specification and the drawings, elements having substantially the same function and configuration are denoted with the same numerals to avoid any redundant description.

[Configuration of Fuel Cell System]

A configuration of a fuel cell system 1 according to an example embodiment of the technology will be described with reference to FIG. 1 to FIG. 3.

Figure 1:
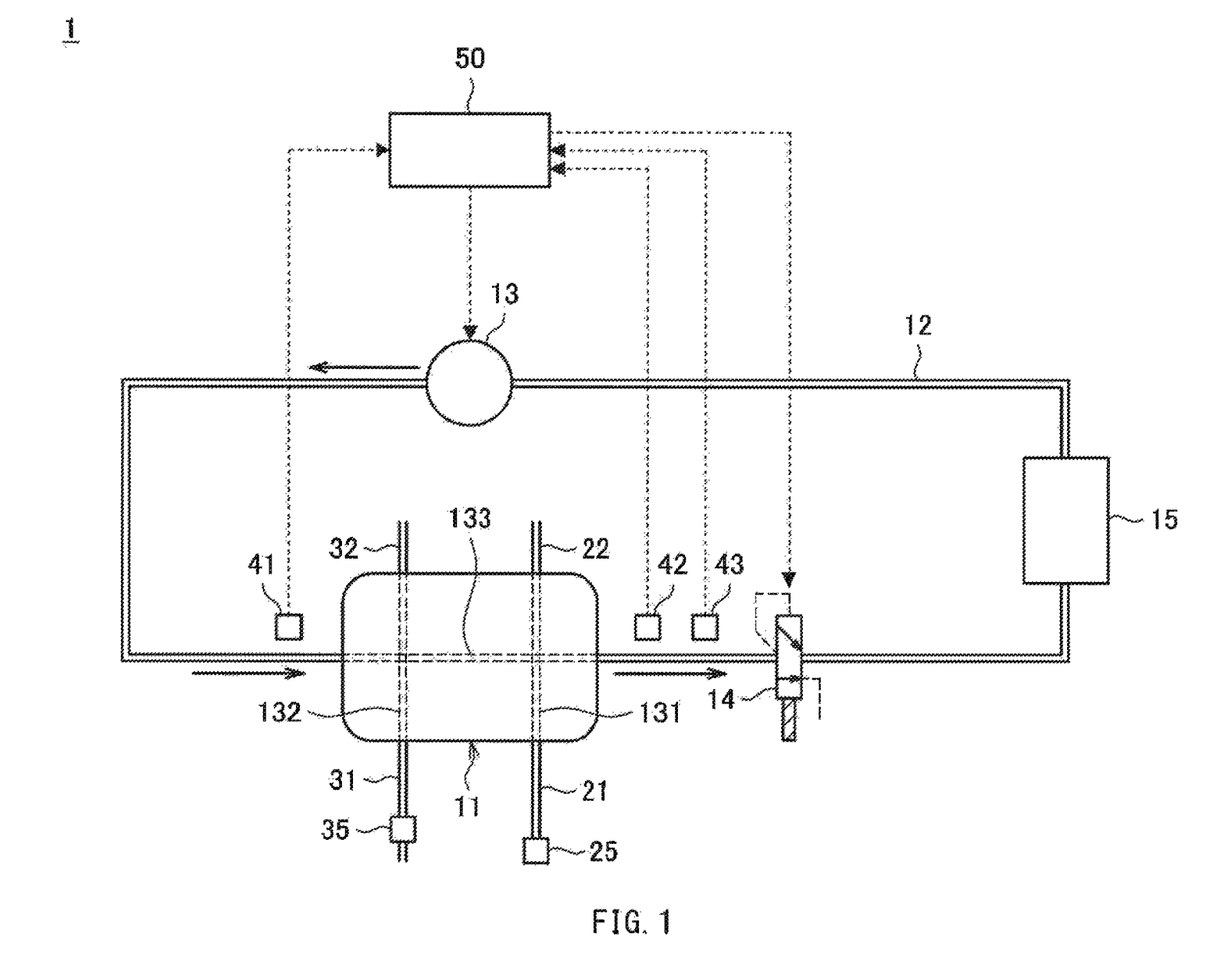
FIG. 1 is a schematic diagram illustrating an outline configuration of a fuel cell system according to one example embodiment of the technology.

FIG. 1 is a schematic diagram illustrating an outline configuration of the fuel cell system 1.

The fuel cell system 1 includes a fuel cell 11. In one example, the fuel cell system 1 may be installed in a vehicle to enable the use of the fuel cell 11 as an electric power source of a driving motor of the vehicle. It is to be noted that a fuel cell system according to any embodiment of the technology may be installed in another apparatus other than a vehicle, for example, in a movable body other than a vehicle, such as a vessel. A fuel cell system according to any embodiment of the technology may also be a stationary system to be used as an electric power generation system in a building.

In one example, the fuel cell system 1 includes the fuel cell 11, a circuit 12, a pump 13, a pressure regulating valve 14, and a control apparatus 50, as illustrated in FIG. 1. A coolant may circulate through the circuit 12. The fuel cell system 1 may further include a radiator 15, an inlet water temperature sensor 41, an outlet water temperature sensor 42, and a water pressure sensor 43.

The fuel cell 11 may generate electric power by causing reaction between fuel gas (e.g., hydrogen gas) and oxidizing gas (e.g., air). In the fuel cell system 1, the hydrogen gas may be supplied to the fuel cell 11 by a hydrogen gas supply channel 21, a hydrogen gas exhaust channel 22, and a hydrogen supply source 25. The hydrogen gas supply channel 21 and the hydrogen gas exhaust channel 22 may be coupled to the fuel cell 11. The air may be supplied to the fuel cell 11 by an air supply channel 31, an air exhaust channel 32, and a supercharger 35. The air supply channel 31 and the air exhaust channel 32 may be coupled to the fuel cell 11.

Figure 2:
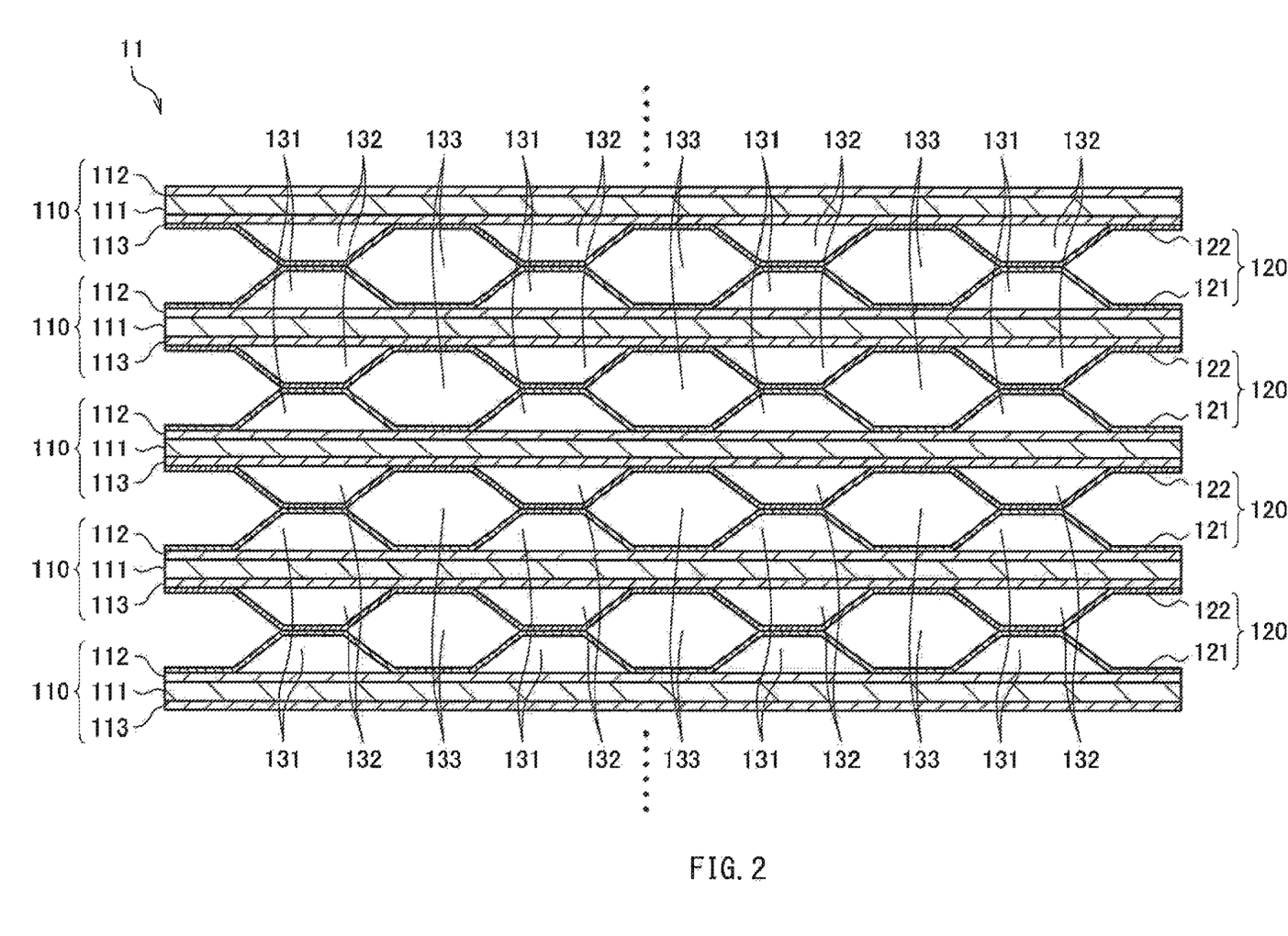
FIG. 2 is a schematic diagram illustrating a configuration of a fuel cell according to one example embodiment of the technology.

FIG. 2 is a schematic diagram illustrating a configuration of the fuel cell 11.

In one example, the fuel cell 11 includes a stack of a plurality of membrane electrode assemblies (MEAs) 110, and separators 120 provided between the adjacent membrane electrode assemblies 110, as illustrated in FIG. 2. The membrane electrode assembly 110 and the separator 120 are stacked alternately in the fuel cell 11.

Each of the membrane electrode assemblies 110 includes an electrolyte membrane 111, an anode electrode 112, and a cathode electrode 113. The electrolyte membrane 111 may have a property of transmitting hydrogen ions. The anode electrode 112 and the cathode electrode 113 may be opposed to each other across the electrolyte membrane 111. The anode electrode 112 and the cathode electrode 113 may each include, for example, a catalyst layer that includes carbon particles carrying platinum or an alloy containing platinum. The anode electrode 112 may lose electrons when electric power is generated, and the cathode electrode 113 may gain electrons when electric power is generated.

Each of the separators 120 has a gas channel through which gas to be supplied to the membrane electrode assemblies 110 flows and a coolant channel 133 through which the coolant (e.g., cooling water) flows. In one example, the separator 120 may have, as the gas channel, a hydrogen channel 131 through which the hydrogen gas flows and an air channel 132 through which the air flows.

In one example, the separator 120 may include an anode-side separator 121 and a cathode-side separator 122. The anode-side separator 121 may be in contact with the anode electrode 112 of the membrane electrode assembly 110. The cathode-side separator 122 may be in contact with the cathode electrode 113 of the adjacent membrane electrode assembly 110.

The anode-side separator 121 and the cathode-side separator 122 may each include, for example, a metal material such as stainless steel or titanium. In one example, the anode-side separator 121 and the cathode-side separator 122 may each be sheet metal (e.g., sheet metal with a thickness of approximately 0.1 mm) that has been subjected to press working.

A surface of the anode-side separator 121 that is in contact with the anode electrode 112 may have the hydrogen channel 131 through which the hydrogen gas to be supplied to the anode electrode 112 flows. In one example, the hydrogen channel 131 may have a groove shape. A path of the hydrogen channel 131 in the anode-side separator 121 is not particularly limited, and may be bent or branched at any position. As illustrated in FIG. 1, the hydrogen gas supply channel 21 may be coupled to one end of the hydrogen channel 131, and the hydrogen gas exhaust channel 22 may be coupled to the other end of the hydrogen channel 131. The hydrogen gas supply channel 21 may be provided with the hydrogen supply source 25. The hydrogen gas sent from the hydrogen supply source 25 to the hydrogen gas supply channel 21 may be supplied to the hydrogen channel 131 in the fuel cell 11 via the hydrogen gas supply channel 21. After flowing through the hydrogen channel 131, the hydrogen gas may be exhausted through the hydrogen gas exhaust channel 22. In one example, the fuel cell 11 may have, as the hydrogen channel 131, a plurality of hydrogen channels 131 provided to enable supply of the hydrogen gas to the membrane electrode assemblies 110.

A surface of the cathode-side separator 122 that is in contact with the cathode electrode 113 may have the air channel 132 through which the air to be supplied to the cathode electrode 113 flows. In one example, the air channel 132 may have a groove shape. A path of the air channel 132 in the cathode-side separator 122 is not particularly limited, and may be bent or branched at any position. As illustrated in FIG. 1, the air supply channel 31 may be coupled to one end of the air channel 132, and the air exhaust channel 32 may be coupled to the other end of the air channel 132. The air supply channel 31 may be provided with the supercharger 35. The air sucked into the air supply channel 31 by the supercharger 35 may be supplied to the air channel 132 in the fuel cell 11 via the air supply channel 31. After flowing through the air channel 132, the air may be exhausted through the air exhaust channel 32. In one example, the fuel cell 11 may have, as the air channel 132, a plurality of air channels 132 provided to enable supply of the air to the membrane electrode assemblies 110.

The anode-side separator 121 and the cathode-side separator 122 may be bonded to each other, and the coolant channel 133 through which the cooling water flows may be provided between the anode-side separator 121 and the cathode-side separator 122 adjacent to each other. In one example, the coolant channel 133 may have a groove shape. A path of the coolant channel 133 between the anode-side separator 121 and the cathode-side separator 122 adjacent to each other is not particularly limited, and may be bent or branched at any position. As illustrated in FIG. 1, the coolant channel 133 may be coupled to the circuit 12, allowing the cooling water circulating through the circuit 12 to flow through the coolant channel 133. The coolant channel 133 may communicate with the circuit 12, to form a portion of a path through which the cooling water circulates. In one example, the fuel cell 11 may have, as the coolant channel 133, a plurality of coolant channels 133 provided to enable supply of the cooling water to the separators 120.

The circuit 12, the pump 13, the pressure regulating valve 14, and the radiator 15 may be provided to cool the fuel cell 11 with the cooling water. In one embodiment, the cooling water may serve as a "coolant". In an alternative embodiment, a coolant other than the cooling water (e.g., a chlorofluorocarbon or alcohol) may be used as the coolant that circulates through the circuit 12.

The circuit 12 is a channel through which the cooling water circulates. The pump 13, the pressure regulating valve 14, and the radiator 15 may be provided in the circuit 12, allowing the cooling water circulating through the circuit 12 to flow through the pump 13, the pressure regulating valve 14, and the radiator 15.

The pump 13 delivers the cooling water toward the coolant channel 133 of the fuel cell 11. In one example, the pump 13 may be provided upstream of the fuel cell 11 in the circuit 12, and may deliver the cooling water toward the downstream side of the circuit 12 with respect to the pump 13. This allows the cooling water to be delivered toward the coolant channel 133 of the fuel cell 11. The control apparatus 50 controls a rotational speed of the pump 13, thereby controlling a flow rate of the cooling water in the coolant channel 133 of the fuel cell 11.

The pressure regulating valve 14 adjusts a pressure of the cooling water in the coolant channel 133 of the fuel cell 11. In one example, the pressure regulating valve 14 may be provided downstream of the fuel cell 11 in the circuit 12, and may adjust the pressure of the cooling water on the upstream side of the circuit 12 with respect to the pressure regulating valve 14. This allows the pressure of the cooling water in the coolant channel 133 of the fuel cell 11 to be adjusted. The control apparatus 50 controls a position of the pressure regulating valve 14, thereby controlling the pressure of the cooling water in the coolant channel 133 of the fuel cell 11.

The radiator 15 may dissipate heat of the cooling water flowing through the circuit 12, thereby cooling the cooling water. In one example, the radiator 15 may be provided downstream of the pressure regulating valve 14 and upstream of the pump 13 in the circuit 12, and may cool the cooling water flowing through the radiator 15. The cooling water warmed by heat exchange with the fuel cell 11 carried out in the coolant channel 133 may thus be cooled by the radiator 15, and thereafter be sent to the pump 13.

The inlet water temperature sensor 41 may detect an inlet water temperature, and output a detection result to the control apparatus 50. The inlet water temperature may be a temperature of the cooling water on the upstream side of the circuit 12 with respect to the fuel cell 11. In one example, the inlet water temperature sensor 41 may be provided near an end of the coolant channel 133 on the upstream side of the circuit 12 (i.e., an inlet of the coolant channel 133). The inlet water temperature sensor 41 may detect, as the inlet water temperature, the temperature of the cooling water at a location where the inlet water temperature sensor 41 is installed. In processes (described later) to be performed by the control apparatus 50, the inlet water temperature may be used as a value corresponding to a temperature of the cooling water to be sent to the fuel cell 11.

The outlet water temperature sensor 42 may detect an outlet water temperature, and output a detection result to the control apparatus 50. The outlet water temperature may be a temperature of the cooling water on the downstream side of the circuit 12 with respect to the fuel cell 11. In one example, the outlet water temperature sensor 42 may be provided near an end of the coolant channel 133 on the downstream side of the circuit 12 (i.e., an outlet of the coolant channel 133). The outlet water temperature sensor 42 may detect, as the outlet water temperature, the temperature of the cooling water at a location where the outlet water temperature sensor 42 is installed. In the processes (described later) to be performed by the control apparatus 50, the outlet water temperature may be used as a value corresponding to a temperature of the fuel cell 11.

The water pressure sensor 43 may detect a pressure of the cooling water on the upstream side of the circuit 12 with respect to the pressure regulating valve 14, and output a detection result to the control apparatus 50. In one example, the water pressure sensor 43 may be provided downstream of the fuel cell 11 and upstream of the pressure regulating valve 14 in the circuit 12. The water pressure sensor 43 may detect the pressure of the cooling water at a location where the water pressure sensor 43 is installed. The pressure of the cooling water detected by the water pressure sensor 43 may hereinafter be referred to as a detected water pressure. In the processes (described later) to be performed by the control apparatus 50, the detected water pressure may be used as a value corresponding to the pressure of the cooling water in the coolant channel 133 of the fuel cell 11.

The control apparatus 50 may control operation of each apparatus in the fuel cell system 1.

The control apparatus 50 may include a central processing unit (CPU), a read only memory (ROM), and a random access memory (RAM), for example. The CPU may be an arithmetic processing unit. The ROM may be a storage device that stores information such as programs and operation parameters to be used by the CPU. The RAM may be a storage device that temporarily stores parameters, for example, that change as appropriate in execution of the CPU.

The control apparatus 50 may communicate with each apparatus in the fuel cell system 1. The control apparatus 50 may communicate with each apparatus by, for example, controller area network (CAN) communication. For example, the control apparatus 50 may communicate with the pump 13, the pressure regulating valve 14, and the sensors in the fuel cell system 1.

It is to be noted that operations of the control apparatus 50 according to an example embodiment of the technology may at least partially be shared by a plurality of control apparatuses, or a plurality of operations may be implemented by one control apparatus. In a case where the operations of the control apparatus 50 are at least partially shared by a plurality of control apparatuses, the plurality of control apparatuses may be coupled to each other via a communication bus of CAN, for example.

Figure 3:
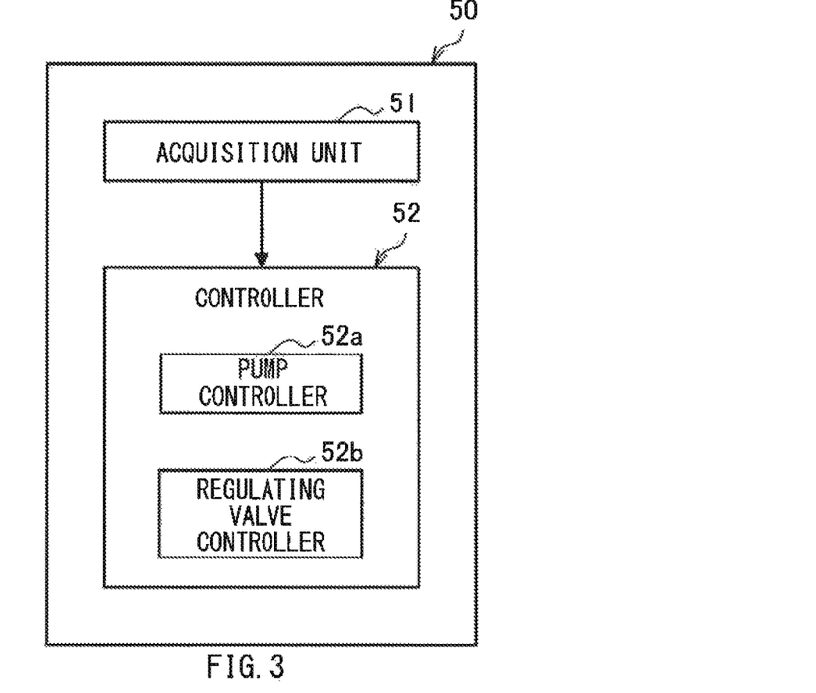
FIG. 3 is a block diagram illustrating an example of a configuration of a control apparatus according to one example embodiment of the technology.

FIG. 3 is a block diagram illustrating an example of a configuration of the control apparatus 50.

The control apparatus 50 may include, for example, an acquisition unit 51 and a controller 52, as illustrated in FIG. 3.

The acquisition unit 51 may acquire various kinds of information to be used in processes performed by the controller 52. The acquisition unit 51 may output the acquired information to the controller 52. For example, the acquisition unit 51 may communicate with the sensors in the fuel cell system 1 to acquire the detection results outputted from the respective sensors.

The controller 52 may execute the processes on the basis of the information acquired by the acquisition unit 51. In one example, the controller 52 may control operation of the pump 13 and the pressure regulating valve 14.

The controller 52 may include, for example, a pump controller 52a and a regulating valve controller 52b.

The pump controller 52a may control operation of the pump 13. In one example, the pump controller 52a may control the rotational speed of the pump 13. This allows the flow rate of the cooling water in the coolant channel 133 of the fuel cell 11 to be controlled.

The regulating valve controller 52b may control operation of the pressure regulating valve 14. In one example, the regulating valve controller 52b may control the position of the pressure regulating valve 14. This allows the pressure of the cooling water in the coolant channel 133 of the fuel cell 11 to be controlled.

As described above, the controller 52 of the control apparatus 50 may control operation of the pump 13 and the pressure regulating valve 14. The controller 52 may control the rotational speed of the pump 13 on the basis of the temperature of the fuel cell 11, thereby controlling the flow rate of the cooling water in the coolant channel 133. The controller 52 may control the position of the pressure regulating valve 14 on the basis of a pressure of the gas in the gas channel of the fuel cell 11, thereby controlling the pressure of the cooling water in the coolant channel 133. Such control makes it possible to achieve both protection of the separators 120 in the fuel cell 11 and optimization of the temperature of the fuel cell 11. Such processes that are related to the control of the pump 13 and the pressure regulating valve 14 and are to be performed by the control apparatus 50 will be described in detail later.

[Operation of Fuel Cell System]

Now, operation of the fuel cell system 1 according to an example embodiment of the technology will be described with reference to FIG. 4 to FIG. 8.

As described above, the pressure of the cooling water in the coolant channel 133 may be controlled by, for example, controlling the flow rate of the cooling water in the coolant channel 133 with the use of the pump 13. However, this method makes it unable to independently perform control of the flow rate of the cooling water in the coolant channel 133 (hereinafter, also referred to as flow rate control), and control of the pressure of the cooling water in the coolant channel 133 (hereinafter, also referred to as hydraulic control). This can make it difficult to achieve both protection of the separators 120 in the fuel cell 11 and optimization of the temperature of the fuel cell 11.

The fuel cell system 1 according to the example embodiment includes the pressure regulating valve 14. This configuration enables the pressure of the cooling water in the coolant channel 133 to be controlled with the use of the pressure regulating valve 14. This makes it possible to perform the flow rate control with the use of the pump 13, independently of the hydraulic control using the pressure regulating valve 14. The fuel cell system 1 thus makes it possible to independently perform the flow rate control based on the control of the pump 13 and the hydraulic control based on the control of the pressure regulating valve 14.

The following description describes, in order, a process related to the control of the pump 13 and a process related to the control of the pressure regulating valve 14. The processes are to be performed by the control apparatus 50 of the fuel cell system 1.

[Control of Pump]

First, the process that is related to the control of the pump 13 and is to be performed by the control apparatus 50 will be described with reference to FIG. 4 to FIG. 6.

Figure 4:
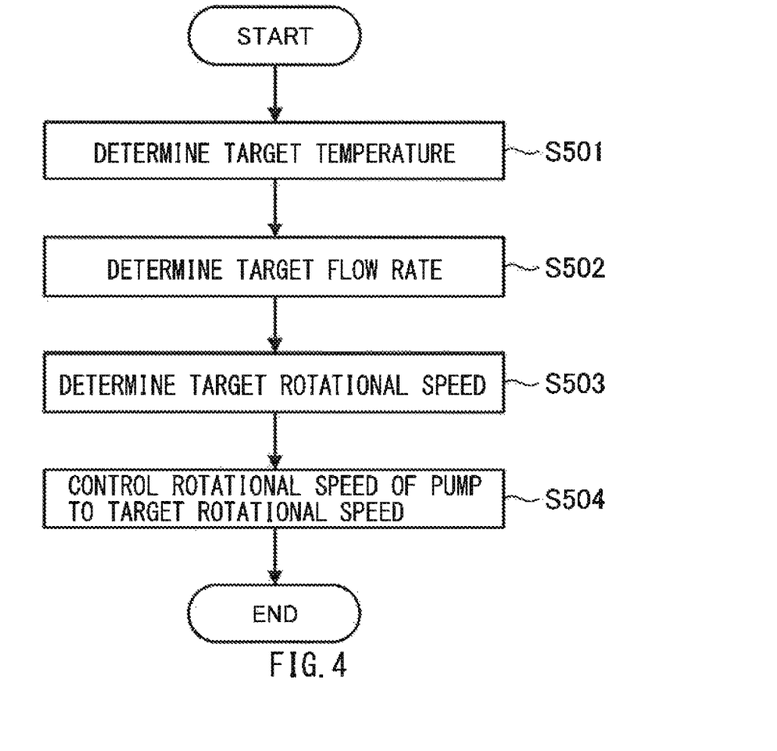
FIG. 4 is a flowchart illustrating an example of a flow of a process that is related to control of a pump and is to be performed by the control apparatus according to one example embodiment of the technology.

FIG. 4 is a flowchart illustrating an example of a flow of the process that is related to the control of the pump 13 and is to be performed by the control apparatus 50. A control flow illustrated in FIG. 4 may be executed repeatedly.

Upon start of the control flow illustrated in FIG. 4, in step S501, the pump controller 52a may first determine a target temperature that is a target value of the temperature of the fuel cell 11.

For example, the pump controller 52a may determine the target temperature on the basis of an output of the fuel cell 11. In one example, the pump controller 52a may determine the target temperature on the basis of the output of the fuel cell 11, to make the fuel cell 11 generate electric power as efficiently as possible. The control apparatus 50 is able to acquire information indicating the output of the fuel cell 11 by, for example, communicating with an apparatus that controls supply of the air and the hydrogen gas to the fuel cell 11. It is to be noted that supply of the air and the hydrogen gas to the fuel cell 11 may be controlled by the control apparatus 50.

Next, in step S502, the pump controller 52a may determine a target flow rate that is a target value of the flow rate of the cooling water in the coolant channel 133.

For example, the pump controller 52a may determine the target flow rate on the basis of the outlet water temperature and the target temperature. Hereinafter, description will be given on an example in which the target flow rate is determined by using a map M1 illustrated in FIG. 5.

Figure 5:
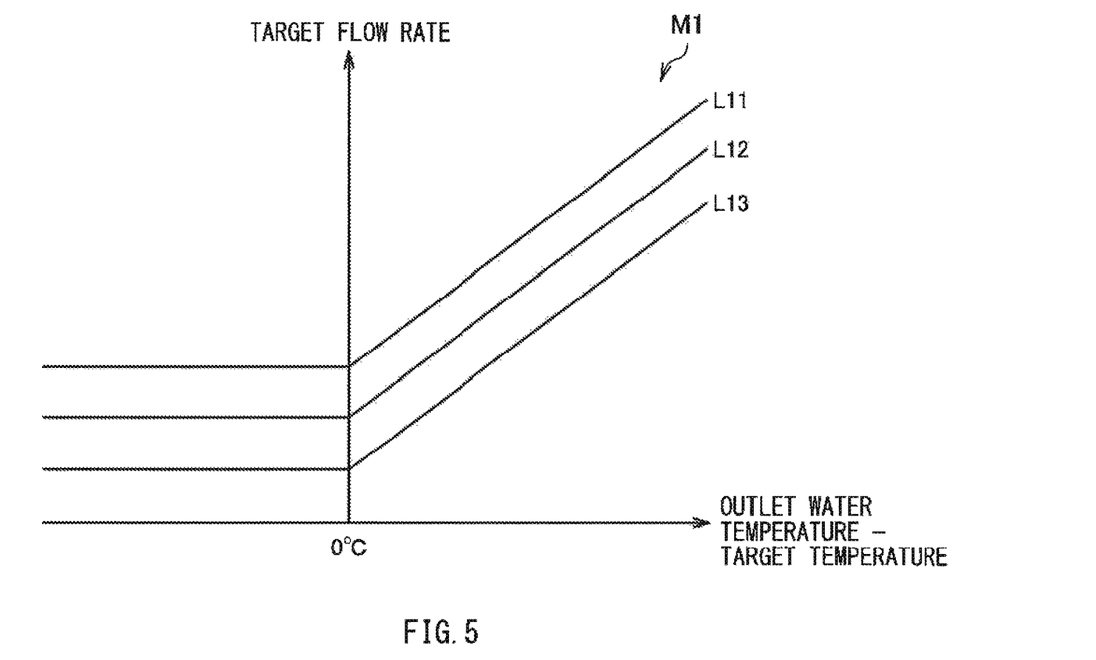
FIG. 5 is a diagram illustrating an example of a map to be used in determining a target flow rate according to one example embodiment of the technology.

FIG. 5 is a diagram illustrating an example of the map M1 to be used in determining the target flow rate.

In the map M1, characteristic lines L11, L12, and L13 define characteristics of the target flow rate with respect to a value "outlet water temperature—target temperature" obtained by subtracting the target temperature from the outlet water temperature. The different characteristic lines L11, L12, and L13 may be used depending on a difference between the outlet water temperature and the inlet water temperature, as will be described later.

Each of the characteristic lines L11, L12, and L13 indicates, in a case where "outlet water temperature—target temperature" is a positive value, a larger target flow rate at a larger "outlet water temperature—target temperature". The outlet water temperature may be a value corresponding to the temperature of the fuel cell 11, as described above. In other words, in a case where the temperature of the fuel cell 11 is higher than the target temperature, the pump controller 52a may determine a larger value as the target flow rate, as a difference between the temperature of the fuel cell 11 and the target temperature is larger. Thus, in a case where the temperature of the fuel cell 11 is higher than the target temperature, it is possible to increase the flow rate of the cooling water in the coolant channel 133, with an increase in the difference between the temperature of the fuel cell 11 and the target temperature. This makes it possible to increase the ability to cool the fuel cell 11 with the cooling water in the coolant channel 133.

Each of the characteristic lines L11, L12, and L13 indicates, in a case where "outlet water temperature—target temperature" is a negative value, a positive value, not zero, as the target flow rate. In other words, in a case where the temperature of the fuel cell 11 is lower than the target temperature, the pump controller 52a may determine a positive value, not zero, as the target flow rate. Thus, in a case where the temperature of the fuel cell 11 is lower than the target temperature, it is possible to reduce residence of the cooling water in the coolant channel 133. This makes it possible to reduce unevenness in temperature distribution of the fuel cell 11 caused by residence of the cooling water.

The characteristic line L11 indicates a larger target flow rate than the characteristic line L12, regardless of the value of "outlet water temperature—target temperature". The characteristic line L12 indicates a larger target flow rate than the characteristic line L13, regardless of the value of "outlet water temperature—target temperature". As the difference between the outlet water temperature and the inlet water temperature becomes smaller, the pump controller 52a may change the characteristic line to be used in determining the target flow rate in the order of the characteristic line L13, the characteristic line L12, and the characteristic line L11. The inlet water temperature may be a value corresponding to the temperature of the cooling water to be sent to the fuel cell 11, as described above. In other words, the pump controller 52a may determine a larger value as the target flow rate, as a difference between the temperature of the fuel cell 11 and the temperature of the coolant to be sent to the fuel cell 11 is smaller. It is thus possible to increase the flow rate of the cooling water in the coolant channel 133 with a decrease in a temperature difference. The temperature difference may be a difference between the temperature of the fuel cell 11 and the temperature of the cooling water to be sent to the fuel cell 11. This makes it possible to reduce lack of the ability to cool the fuel cell 11 with the cooling water in the coolant channel 133 due to a decrease in the temperature difference.

In the example illustrated in FIG. 5, three characteristic lines, i.e., the characteristic lines L11, L12, and L13, may be set in the map M1 as the different characteristic lines to be used depending on the difference between the outlet water temperature and the inlet water temperature. In the map M1, however, two or four or more different characteristic lines may be used depending on the difference between the outlet water temperature and the inlet water temperature. In another example, a characteristic line that defines characteristics of the target flow rate with respect to "outlet water temperature—target temperature" may change continuously, depending on the difference between the outlet water temperature and the inlet water temperature.

Next, in step S503, the pump controller 52a may determine a target rotational speed that is a target value of the rotational speed of the pump 13.

In one example, the pump controller 52a may determine the target rotational speed on the basis of the target flow rate, to make the flow rate of the cooling water in the coolant channel 133 substantially equal to the target flow rate determined in step S502. Hereinafter, description will be given on an example in which the target rotational speed is determined by using a map M2 illustrated in FIG. 6.

Figure 6:
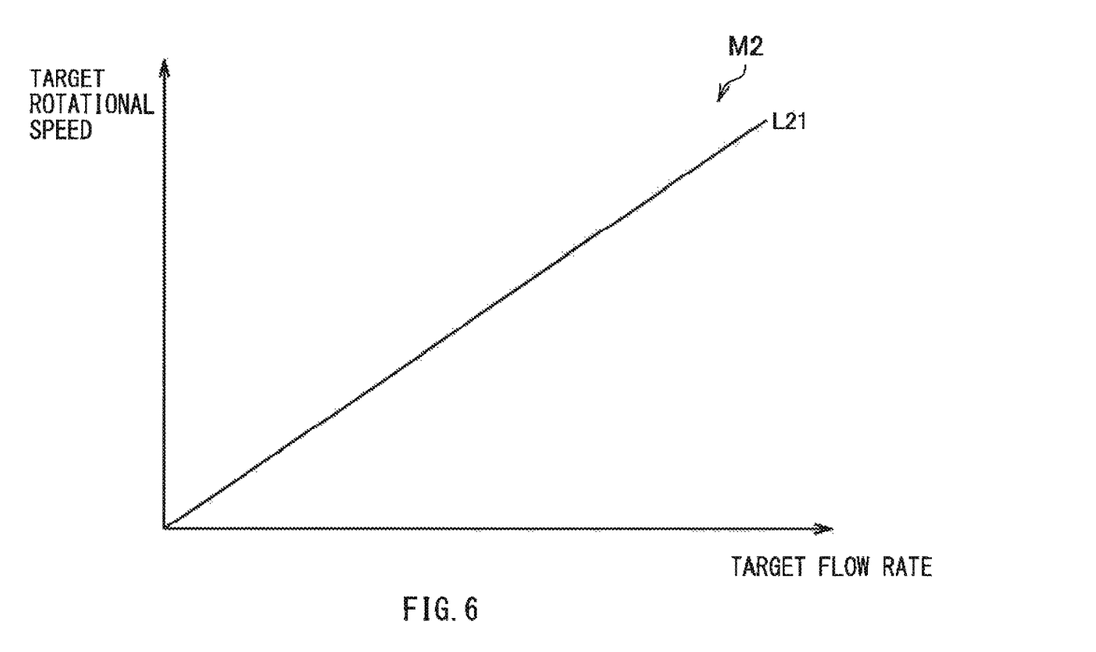
FIG. 6 is a diagram illustrating an example of a map to be used in determining a target rotational speed according to one example embodiment of the technology.

FIG. 6 is a diagram illustrating an example of the map M2 to be used in determining the target rotational speed.

In the map M2, a characteristic line L21 defines characteristics of the target rotational speed with respect to the target flow rate.

The characteristic line L21 indicates a larger target rotational speed at a larger target flow rate. In other words, the pump controller 52a may determine a larger value as the target rotational speed, as the target flow rate is larger.

Next, in step S504, the pump controller 52a may control the rotational speed of the pump 13 to the target rotational speed determined in step S503. This control enables the flow rate of the cooling water in the coolant channel 133 to be controlled to the target flow rate determined in step S502. This makes it possible to control the temperature of the fuel cell 11 to the target temperature determined in step S501.

Next, the control flow illustrated in FIG. 4 may end.

As described above, the control flow illustrated in FIG. 4 may cause the control apparatus 50 to, in a case where the temperature of the fuel cell 11 is higher than the target temperature, increase the flow rate of the cooling water in the coolant channel 133, with an increase in the difference between the temperature of the fuel cell 11 and the target temperature.

As in the control flow illustrated in FIG. 4, in terms of more appropriately controlling the temperature of the fuel cell 11, the control apparatus 50 may increase the flow rate of the cooling water in the coolant channel 133, with a decrease in the difference between the temperature of the fuel cell 11 and the temperature of the coolant to be sent to the fuel cell 11.

[Control of Pressure Regulating Valve]

Now, the process that is related to the control of the pressure regulating valve 14 and is to be performed by the control apparatus 50 will be described with reference to FIG. 7 and FIG. 8.

Figure 7:
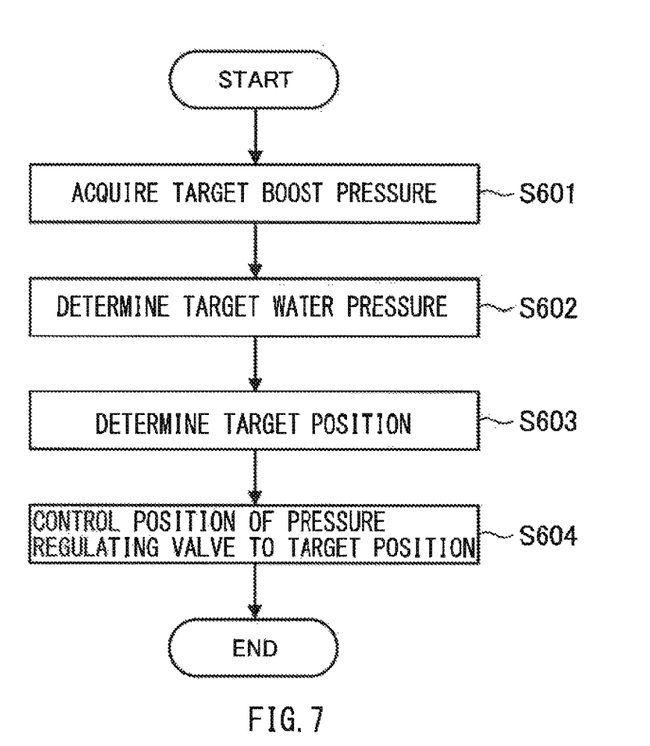
FIG. 7 is a flowchart illustrating an example of a flow of a process that is related to control of a pressure regulating valve and is to be performed by the control apparatus according to one example embodiment of the technology.

FIG. 7 is a flowchart illustrating an example of a flow of the process that is related to the control of the pressure regulating valve 14 and is to be performed by the control apparatus 50. A control flow illustrated in FIG. 7 may be executed repeatedly.

Upon start of the control flow illustrated in FIG. 7, in step S601, the regulating valve controller 52b may first acquire a target boost pressure that is a target value of a boost pressure produced by the supercharger 35. The boost pressure may refer to a pressure of the air sucked by the supercharger 35 to be supplied to the air channel 132. The target boost pressure may correspond to a target value of a pressure of the air in the air channel 132.

For example, it is possible for the control apparatus 50 to acquire the target boost pressure by communicating with the apparatus that controls supply of the air and the hydrogen gas to the fuel cell 11. The target boost pressure may be determined on the basis of the output of the fuel cell 11.

For example, target values of a flow rate and the pressure (i.e., boost pressure) of the air sucked by the supercharger 35 may be determined to make the output of the fuel cell 11 satisfy a requested value. The supercharger 35 may be driven to make the flow rate and the pressure of the air substantially equal to the target values. A pressure of the hydrogen gas in the hydrogen channel 131 (hereinafter, also referred to as a hydrogen gas pressure) may be controlled to approach the pressure of the air in the air channel 132 (hereinafter, also referred to as an air pressure). This control may be achieved by, for example, controlling a control valve provided in the hydrogen channel 131. In other words, the hydrogen gas pressure may be controlled to substantially match the air pressure. Therefore, the hydrogen gas pressure and the air pressure (i.e., boost pressure) may substantially match each other, and change to follow the target boost pressure.

Adjustment of the hydrogen gas pressure generally exhibits more favorable responsiveness than adjustment of the air pressure. Therefore, in a case where the hydrogen gas pressure is controlled to approach the air pressure, it is possible to make discrepancy less likely to occur between the hydrogen gas pressure and the air pressure (i.e., boost pressure), as compared with a case where the air pressure is controlled to approach the hydrogen gas pressure.

It is to be noted that the above-described control of the air pressure and the hydrogen gas pressure may be performed by the control apparatus 50.

Next, in step S602, the regulating valve controller 52b may determine a target water pressure that is a target value of the pressure of the cooling water in the coolant channel 133.

For example, the regulating valve controller 52b may determine the target water pressure on the basis of the target boost pressure. Hereinafter, description will be given on an example in which the target water pressure is determined by using a map M3 illustrated in FIG. 8.

Figure 8:
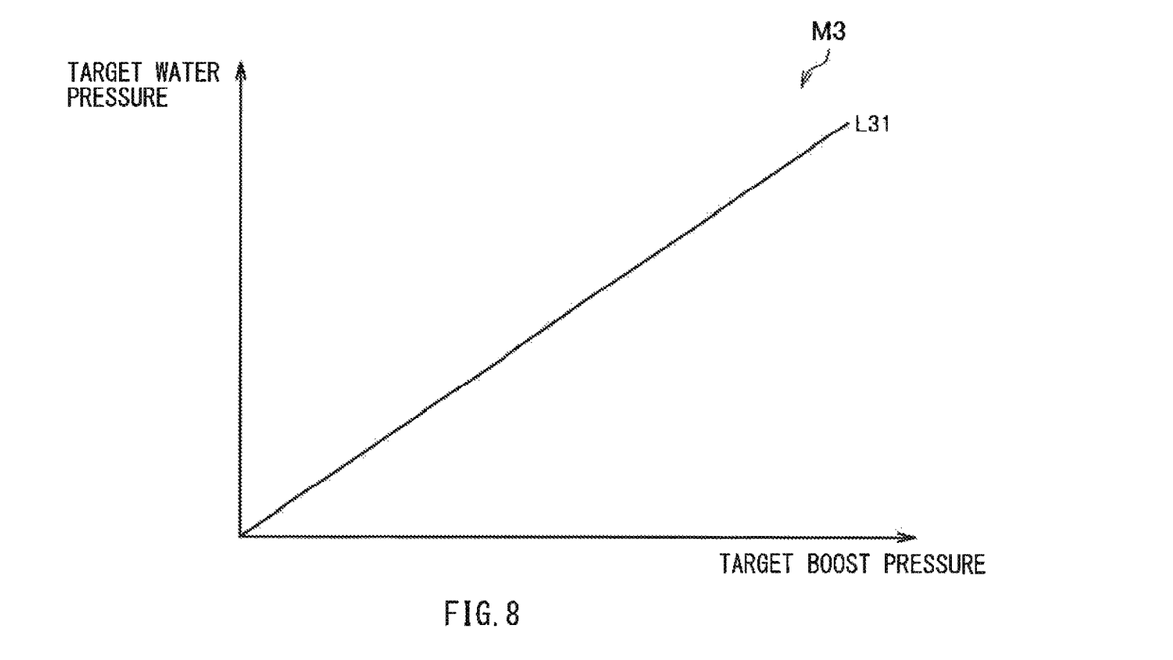
FIG. 8 is a diagram illustrating an example of a map to be used in determining a target water pressure according to one example embodiment of the technology.

FIG. 8 is a diagram illustrating an example of the map M3 to be used in determining the target water pressure.

In the map M3, a characteristic line L31 defines characteristics of the target water pressure with respect to the target boost pressure.

The characteristic line L31 indicates a larger target water pressure at a larger target boost pressure. In one example, the characteristic line L31 defines the target water pressure as substantially matching the target boost pressure. In other words, the regulating valve controller 52b may determine, as the target water pressure, a value substantially matching the target boost pressure.

Next, in step S603, the regulating valve controller 52b may determine a target position that is a target value of the position of the pressure regulating valve 14.

In one example, the regulating valve controller 52b may determine the target position on the basis of the target water pressure, to make the pressure of the cooling water in the coolant channel 133 substantially equal to the target water pressure determined in step S602. For example, the regulating valve controller 52b may basically determine a smaller value as the target position, as the target water pressure is larger. In determining the target position, another parameter such as a temperature of the cooling water may further be used.

Next, in step S604, the regulating valve controller 52b may control the position of the pressure regulating valve 14 to the target position. This allows the pressure of the cooling water in the coolant channel 133 to be controlled to the target water pressure determined in step S602.

The target water pressure may be determined to substantially match the target boost pressure, as described above. This enables the pressure of the cooling water in the coolant channel 133 to be controlled to substantially match the target boost pressure. In addition, the hydrogen gas pressure and the air pressure may substantially match each other, and change to follow the target boost pressure. This enables a pressure of the coolant in the coolant channel 133 to be controlled to approach the pressure of the gas in the gas channel.

Next, the control flow illustrated in FIG. 7 may end.

In controlling the pressure regulating valve 14, the regulating valve controller 52b may further perform, as the control of the position of the pressure regulating valve 14, control (i.e., feedback control) based on a difference between the detected water pressure and the target water pressure. The detected water pressure may correspond to the pressure of the cooling water in the coolant channel 133.

As described above, the control flow illustrated in FIG. 7 may cause the control apparatus 50 to control the pressure of the cooling water in the coolant channel 133 to make the pressure of the cooling water in the coolant channel 133 approach the pressure of the gas in the gas channel.

As in the control flow illustrated in FIG. 7, in terms of more appropriately protecting the separators 120, the control apparatus 50 may control the pressure of the cooling water in the coolant channel 133 on the basis of the target boost pressure. In one example, the control apparatus 50 may control the pressure of the cooling water in the coolant channel 133 to make the pressure of the cooling water in the coolant channel 133 substantially match the target boost pressure.

The above description describes an example in which the pressure of the cooling water in the coolant channel 133 is controlled on the basis of the target boost pressure. In another example, the control apparatus 50 may control the pressure of the cooling water in the coolant channel 133 on the basis of another parameter other than the target boost pressure. For example, the control apparatus 50 may control the pressure of the cooling water in the coolant channel 133 to make the pressure of the cooling water in the coolant channel 133 substantially match a detected value of the hydrogen gas pressure or the air pressure.

[Example Effects of Fuel Cell System]

Now, example effects of the fuel cell system 1 according to an example embodiment of the technology will be described.

In the fuel cell system 1 according to the example embodiment, the circuit 12 through which the coolant (e.g., cooling water) circulates includes the pump 13 that delivers the coolant toward the coolant channel 133 of the separator 120 of the fuel cell 11. The circuit 12 also includes the pressure regulating valve 14 that adjusts the pressure of the coolant in the coolant channel 133. This configuration makes it possible to independently perform the flow rate control based on the control of the pump 13 and the hydraulic control based on the control of the pressure regulating valve 14. The flow rate control may refer to the control of the flow rate of the cooling water in the coolant channel 133. The hydraulic control may refer to the control of the pressure of the cooling water in the coolant channel 133.

The control apparatus 50 controls the rotational speed of the pump 13 on the basis of the temperature of the fuel cell 11, thereby controlling the flow rate of the coolant in the coolant channel 133. This makes it possible to appropriately control the temperature of the fuel cell 11. The control apparatus 50 also controls the position of the pressure regulating valve 14 on the basis of the pressure of the gas in the gas channel of the separator 120 of the fuel cell 11, thereby controlling the pressure of the coolant in the coolant channel 133. The gas in the gas channel may include, for example, the hydrogen gas in the hydrogen channel 131 and the air in the air channel 132. Such control makes it possible to reduce the pressure difference between the gas in the gas channel and the coolant in the coolant channel 133. This makes it possible to reduce damage to the separators 120 due to stress caused in the separators 120 by the pressure difference, which helps to protect the separators 120.

As described above, the fuel cell system 1 makes it possible to independently perform optimization of the temperature of the fuel cell based on the flow rate control, and protection of the separators 120 based on the hydraulic control. This makes it possible to achieve both protection of the separators 120 in the fuel cell 11 and optimization of the temperature of the fuel cell 11.

In recent years, a fuel cell system to be installed in a vehicle, for example, often uses relatively thin sheet metal as a material of the separators 120, as in the fuel cell system 1. In this case, the separators 120 are more likely to yield because of stress caused by the pressure difference between the gas in the gas channel and the coolant in the coolant channel 133, as compared with a case of using carbon as the material of the separators 120, for example. This makes it more necessary to reduce the pressure difference between the gas in the gas channel and the coolant in the coolant channel 133. Consequently, in a case of using sheet metal as the material of the separators 120, it is possible to make effective use of the effect of achieving both protection of the separators 120 in the fuel cell 11 and optimization of the temperature of the fuel cell 11. This effect may be achieved by independently performing optimization of the temperature of the fuel cell based on the flow rate control, and protection of the separators 120 based on the hydraulic control.

In the fuel cell system 1 according to some embodiments, the control apparatus 50 may control the pressure of the coolant in the coolant channel 133 to make the pressure of the coolant in the coolant channel 133 approach the pressure of the gas in the gas channel. This makes it possible to appropriately reduce the pressure difference between the gas in the gas channel and the coolant in the coolant channel 133, which helps to appropriately protect the separators 120.

In the fuel cell system 1 according to some embodiments, the separator 120 may have, as the gas channel, the hydrogen channel 131 through which the hydrogen gas flows and the air channel 132 through which the air flows. The air sucked by the supercharger 35 may be supplied to the air channel 132. A fuel cell system to be installed in a vehicle, for example, often uses the supercharger 35 for supply of the air to the fuel cell 11, to increase power density of the fuel cell 11, as in some embodiments of the fuel cell system 1. In this case, using the supercharger 35 makes the pressure of the gas in the gas channel of the separator 120 relatively high. This makes it more necessary to reduce the pressure difference between the gas in the gas channel and the coolant in the coolant channel 133.

Consequently, in a case of using the supercharger 35 for supply of the air to the fuel cell 11, it is possible to make effective use of the effect of achieving both protection of the separators 120 in the fuel cell 11 and optimization of the temperature of the fuel cell 11. This effect may be achieved by independently performing optimization of the temperature of the fuel cell based on the flow rate control, and protection of the separators 120 based on the hydraulic control.

In the fuel cell system 1 according to some embodiments, the pressure of the hydrogen gas in the hydrogen channel 131 (i.e., the hydrogen gas pressure) may be controlled to approach the pressure of the air in the air channel 132 (i.e., the air pressure). The control apparatus 50 may control the pressure of the coolant in the coolant channel 133 on the basis of the target boost pressure corresponding to the target value of the pressure of the air in the air channel 132. In a case where the hydrogen gas pressure is controlled to approach the air pressure and the air sucked by the supercharger 35 is supplied to the air channel 132, the hydrogen gas pressure and the air pressure may change to follow the target boost pressure. Therefore, controlling the pressure of the coolant in the coolant channel 133 on the basis of the target boost pressure, makes it possible to reduce delay of a change in the pressure of the coolant with respect to a change in the hydrogen gas pressure and the air pressure, as compared with a case of controlling the pressure of the coolant on the basis of the detected value of the hydrogen gas pressure or the air pressure, for example. This makes it possible to more appropriately reduce the pressure difference between the gas in the gas channel and the coolant in the coolant channel 133, which helps to more appropriately protect the separators 120.

In the fuel cell system 1 according to some embodiments, the control apparatus 50 may, in a case where the temperature of the fuel cell 11 is higher than the target temperature, increase the flow rate of the coolant in the coolant channel 133, with an increase in the difference between the temperature of the fuel cell 11 and the target temperature. This makes it possible to increase the ability to cool the fuel cell 11 with the coolant in the coolant channel 133, with an increase in the difference between the temperature of the fuel cell 11 and the target temperature. This helps to appropriately optimize the temperature of the fuel cell 11.

In the fuel cell system 1 according to some embodiments, the control apparatus 50 may increase the flow rate of the coolant in the coolant channel 133, with a decrease in the difference between the temperature of the fuel cell 11 and the temperature of the coolant to be sent to the fuel cell 11. This makes it possible to reduce lack of the ability to cool the fuel cell 11 with the coolant in the coolant channel 133 due to a decrease in the difference between the temperature of the fuel cell 11 and the temperature of the coolant to be sent to the fuel cell 11. This helps to appropriately control the temperature of the fuel cell 11.

Although some embodiments of the technology have been described in the foregoing by way of example with reference to the accompanying drawings, the technology is by no means limited to the embodiments described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

For example, the above description describes the configuration of the fuel cell system 1 with reference to FIG. 1, but a configuration of a fuel cell system according to any embodiment of the technology is not limited to such an example. For example, a modification, such as deletion, addition, or change of one or more elements, may be made to the fuel cell system 1 illustrated in FIG. 1. Examples of a fuel cell system according to any embodiment of the technology may include the fuel cell system 1 illustrated in FIG. 1 not including the supercharger 35.

For example, the above description describes the configuration of the fuel cell 11 with reference to FIG. 2, but a configuration of a fuel cell according to any embodiment of the technology is not limited to such an example. For example, a modification, such as deletion, addition, or change of one or more elements, may be made to the fuel cell 11 illustrated in FIG. 2. Examples of a fuel cell according to any embodiment of the technology may include the fuel cell 11 illustrated in FIG. 2 alternatively including carbon as a material of the separators 120.

For example, the above description describes an example in which the outlet water temperature detected by the outlet water temperature sensor 42 is used as a value corresponding to the temperature of the fuel cell 11. In another example, a detection result of another sensor other than the outlet water temperature sensor 42 may be used as a value corresponding to the temperature of the fuel cell 11. The sensor other than the outlet water temperature sensor 42 may be, for example, a sensor that detects a temperature of a portion of the fuel cell 11. In such a case, the outlet water temperature sensor 42 may be omitted from the configuration of the fuel cell system 1.

In addition, for example, the processes described with reference to the flowcharts according to some embodiments described in this specification do not necessarily have to be executed in the order illustrated in the flowcharts. Furthermore, additional processing steps may be adopted, or some processing steps may be omitted.

The control apparatus 50 illustrated in FIG. 3 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the control apparatus 50. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and an SRAM, and the nonvolatile memory may include a ROM and an NVRAM. The ASIC is an integrated circuit (IC) customized to perform, and the FPGA is an integrated circuit designed to be configured after manufacturing in order to perform, all or a part of the functions of the control apparatus 50 illustrated in FIG. 3.

The invention claimed is:

1. A fuel cell system comprising:
a fuel cell including
membrane electrode assemblies stacked on each other and including adjacent membrane electrode assemblies, each of the membrane electrode assemblies including an electrolyte membrane, an anode electrode, and a cathode electrode, and
a separator provided between the adjacent membrane electrode assemblies and having a gas channel and a coolant channel, the gas channel being configured to allow gas to be supplied to the membrane electrode assemblies to flow therethrough, the coolant channel being configured to allow a coolant to flow therethrough;
a circuit coupled to the coolant channel and configured to allow the coolant to circulate therethrough;
a pump provided in the circuit and configured to deliver the coolant toward the coolant channel;
a pressure regulating valve provided in the circuit and configured to adjust a pressure of the coolant in the coolant channel; and
a control apparatus configured to control operation of each of the pump and the pressure regulating valve, and configured to
control a flow rate of the coolant in the coolant channel by controlling a rotational speed of the pump on a basis of a temperature of the fuel cell, and
control the pressure of the coolant in the coolant channel by controlling a position of the pressure regulating valve on a basis of a pressure of the gas in the gas channel, wherein
the gas channel of the separator comprises a hydrogen channel and an air channel, the hydrogen channel being configured to allow hydrogen gas to flow therethrough, the air channel being configured to allow air to flow therethrough,
the air channel is configured to be supplied with air sucked by a supercharger,
a pressure of the hydrogen gas in the hydrogen channel is controlled to approach a pressure of the air in the air channel, and
the control apparatus is configured to control the pressure of the coolant in the coolant channel, on a basis of a target boost pressure corresponding to a target value of the pressure of the air in the air channel.

2. The fuel cell system according to claim 1, wherein the control apparatus is configured to control the pressure of the coolant in the coolant channel to make the pressure of the coolant in the coolant channel approach the pressure of the gas in the gas channel.

3. The fuel cell system according to claim 1, wherein the control apparatus is configured to, in a case where the temperature of the fuel cell is higher than a target temperature, increase the flow rate of the coolant in the coolant channel, with an increase in a difference between the temperature of the fuel cell and the target temperature.

4. The fuel cell system according to claim 2, wherein the control apparatus is configured to, in a case where the temperature of the fuel cell is higher than a target temperature, increase the flow rate of the coolant in the coolant channel, with an increase in a difference between the temperature of the fuel cell and the target temperature.

5. The fuel cell system according to claim 1, wherein the control apparatus is configured to increase the flow rate of the coolant in the coolant channel, with a decrease in a difference between the temperature of the fuel cell and a temperature of the coolant to be sent to the fuel cell.

6. The fuel cell system according to claim 2, wherein the control apparatus is configured to increase the flow rate of the coolant in the coolant channel, with a decrease in a difference between the temperature of the fuel cell and a temperature of the coolant to be sent to the fuel cell.

7. A control apparatus configured to control a fuel cell system, the fuel cell system including
a fuel cell including
membrane electrode assemblies stacked on each other and including adjacent membrane electrode assemblies, each of the membrane electrode assemblies including an electrolyte membrane, an anode electrode, and a cathode electrode, and
a separator provided between the adjacent membrane electrode assemblies and having a gas channel and a coolant channel, the gas channel being configured to allow gas to be supplied to the membrane electrode assemblies to flow therethrough, the coolant channel being configured to allow a coolant to flow therethrough,
a circuit coupled to the coolant channel and configured to allow the coolant to circulate therethrough,
a pump provided in the circuit and configured to deliver the coolant toward the coolant channel, and
a pressure regulating valve provided in the circuit and configured to adjust a pressure of the coolant in the coolant channel,
the control apparatus comprising
a controller configured to control operation of each of the pump and the pressure regulating valve, and configured to
control a flow rate of the coolant in the coolant channel by controlling a rotational speed of the pump on a basis of a temperature of the fuel cell, and
control the pressure of the coolant in the coolant channel by controlling a position of the pressure regulating valve on a basis of a pressure of the gas in the gas channel, wherein
the gas channel of the separator comprises a hydrogen channel and an air channel, the hydrogen channel being configured to allow hydrogen gas to flow therethrough, the air channel being configured to allow air to flow therethrough,
the air channel is configured to be supplied with air sucked by a supercharger,
a pressure of the hydrogen gas in the hydrogen channel is controlled to approach a pressure of the air in the air channel, and
the controller is configured to control the pressure of the coolant in the coolant channel, on a basis of a target boost pressure corresponding to a target value of the pressure of the air in the air channel.

8. A control method that controls a fuel cell system, the fuel cell system including
a fuel cell including
membrane electrode assemblies stacked on each other and including adjacent membrane electrode assemblies, each of the membrane electrode assemblies including an electrolyte membrane, an anode electrode, and a cathode electrode, and
a separator provided between the adjacent membrane electrode assemblies and having a gas channel and a coolant channel, the gas channel being configured to allow gas to be supplied to the membrane electrode assemblies to flow therethrough, the coolant channel being configured to allow a coolant to flow therethrough,
a circuit coupled to the coolant channel and configured to allow the coolant to circulate therethrough,
a pump provided in the circuit and configured to deliver the coolant toward the coolant channel, and
a pressure regulating valve provided in the circuit and configured to adjust a pressure of the coolant in the coolant channel,
the control method comprising:
controlling a flow rate of the coolant in the coolant channel by controlling a rotational speed of the pump on a basis of a temperature of the fuel cell; and
controlling the pressure of the coolant in the coolant channel by controlling a position of the pressure regulating valve on a basis of a pressure of the gas in the gas channel, wherein
the gas channel of the separator comprises a hydrogen channel and an air channel, the hydrogen channel being configured to allow hydrogen gas to flow therethrough, the air channel being configured to allow air to flow therethrough,
the air channel is configured to be supplied with air sucked by a supercharger,
a pressure of the hydrogen gas in the hydrogen channel is controlled to approach a pressure of the air in the air channel, and
the pressure of the coolant in the coolant channel is controlled, on a basis of a target boost pressure corresponding to a target value of the pressure of the air in the air channel.

* * * * *